Patented Mar. 29, 1938

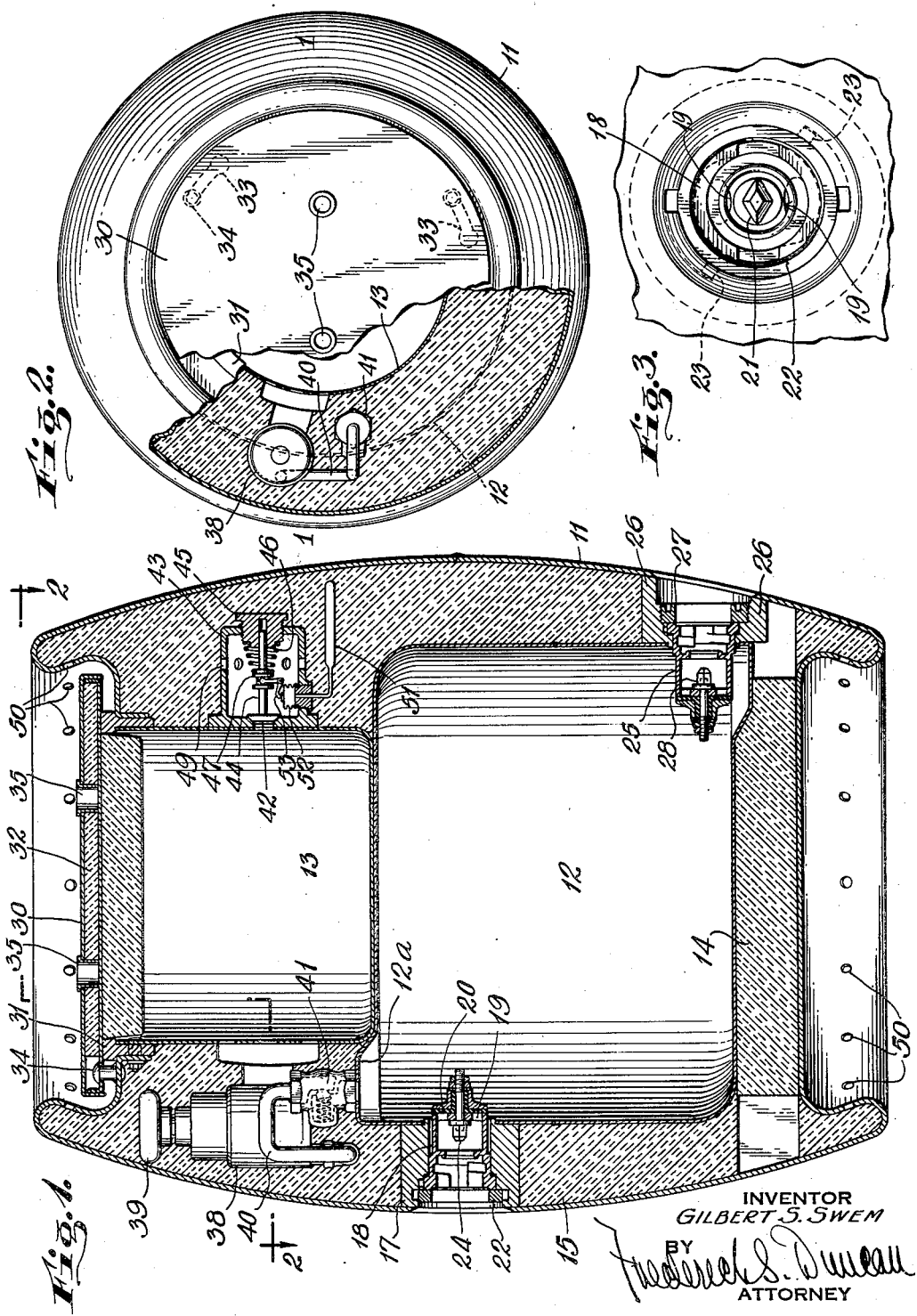

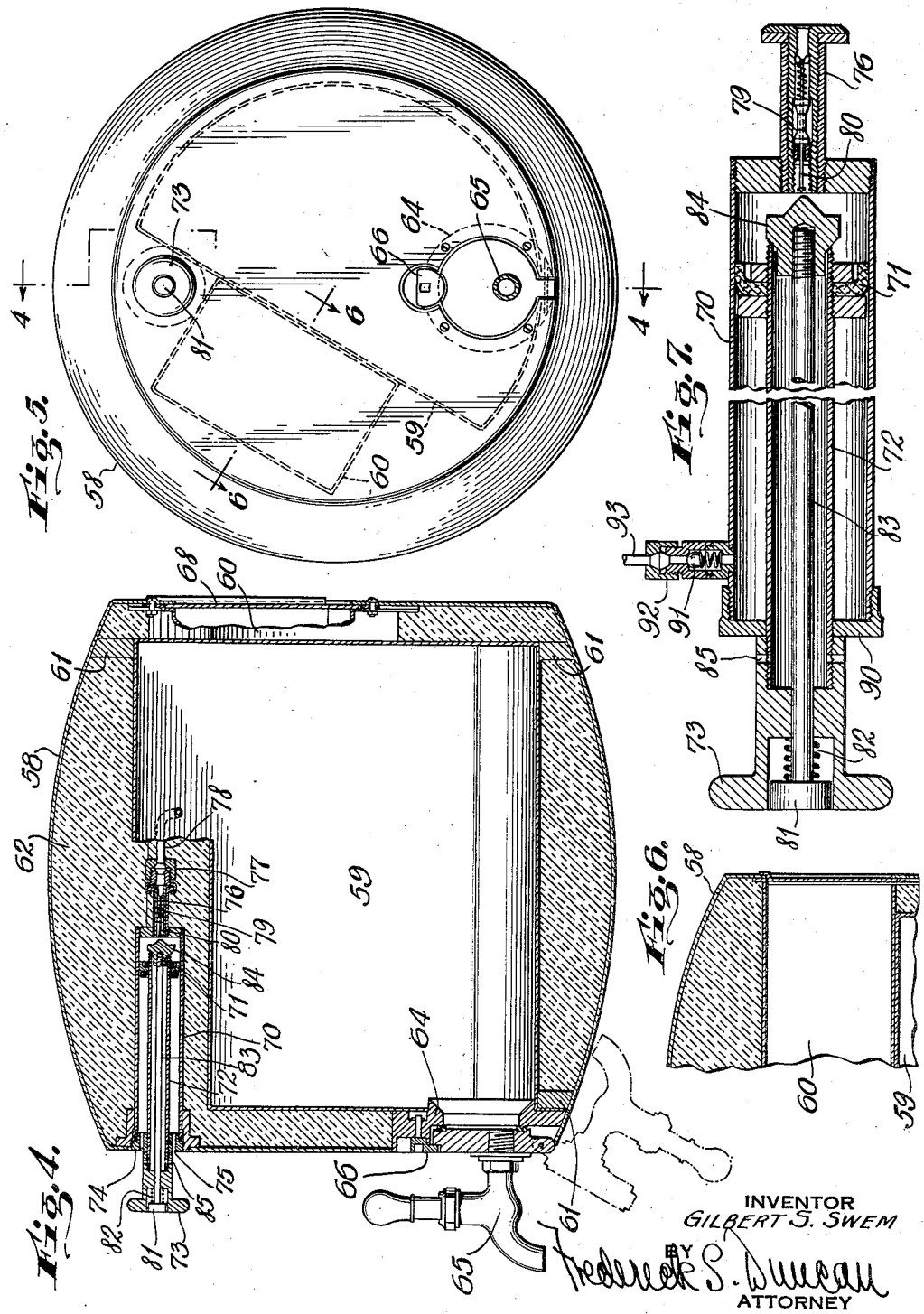

2,112,637

UNITED STATES PATENT OFFICE 2,112,637

BEVERAGE COOLING AND DISPENSING APPARATUS

Gilbert S. Swem, Brooklyn, N. Y., assignor, by mesne assignments, to Jean Karp, Brooklyn, N. Y.

Application October 30, 1933, Serial No. 695,867

11 Claims. (Cl. 62—91.5)

The present invention relates to apparatus for cooling and dispensing effervescing beverages.

A specific object of the invention is to provide a container for draught beer and other beverages in which means are embodied for maintaining the gaseous content of the beverage at a substantially normal value despite intermittent withdrawals of the same. Beer is charged into kegs or other containers with a predetermined content of carbon dioxide, but as the beverage is drawn off the pressure in the ordinary container is correspondingly lowered and the gas escapes from the liquid, particularly if considerable time elapses between withdrawals, until, eventually, the beer becomes flat and unpalatable. It is an object of the present invention to overcome this difficulty by maintaining a substantially constant pressure in the container.

It is desirable to keep beverages such as beer at a predetermined low temperature and for this reason refrigerating apparatus is commonly employed at establishments where the beverage is sold on draught. An object of the present invention is to incorporate refrigerating means in the container itself so as to avoid the necessity of installing elaborate refrigerating plants in places where the beverage is dispensed.

Another object of the invention is to provide a container with a receptacle for solidified carbon dioxide or "dry ice" as it is commonly called, to keep the beverage cool.

A further object of the invention is to provide means for controlling the refrigerating effect of the dry ice.

A still further object of the invention is to utilize the gas that sublimes from the dry ice to maintain a carbon dioxide atmosphere of predetermined constant pressure on the beverage so that there can be no loss of the gas content of the beverage due to diffusion.

With the above-named objects in view and others which will appear hereinafter, I shall now describe a preferred embodiment of my invention and also certain modifications thereof and thereafter the novelty and scope of the invention will be pointed out in the claims.

In the accompanying drawings;

Figure 1 is a view in vertical section of a preferred embodiment of my invention, the section being taken on the line 1—1 of Fig. 2;

Fig. 2 is a top plan view of the device partly in section, the section being taken on the line 2—2 of Fig. 1;

Fig. 3 is an end view of a valve used in the device;

Fig. 4 is a view in vertical section of another embodiment of my invention in which a pump is employed to maintain the desired pressure upon the beverage, the section being taken on the line 4—4 of Fig. 5;

Fig. 5 is a front elevation of the device shown in Fig. 4 with a faucet cut away;

Fig. 6 is a fragmental view in section taken on the line 6—6 of Fig. 5; and

Fig. 7 is a view in longitudinal section of a pump similar to that shown in Fig. 4, but with a modified intake port.

My improved cooling and dispensing device is preferably given the external appearance of a keg, as shown in Fig. 1. This keg is preferably made of sheet metal and comprises an outer shell 11 with a pair of sheet metal receptacles or containers 12 and 13 therewithin. The container 12 is adapted to contain the beverage that is to be dispensed and the other container 13 serves as a receptacle for a quantity of dry ice. The container 12 is supported on a transverse rigid member 14 of heat insulating material, and container 13 is supported directly upon container 12. Between the containers and the shell 11 there is a filling of loose insulation material 15.

At the belly of the keg there is a bushing or tubular fitting 17 in which is supported a filling valve. This valve may be of standard construction comprising a casing 18 provided with ports 19 at its inner end which are normally closed by a valve 20. The stem 21 of the valve is of such form that when a suitable coupling member is applied it will engage this stem and by turning the coupling member the valve may be opened to admit the beverage to the receptacle 12. This filling valve is secured in the fitting 17 by means of a collar 22 which has projections 23 that enter cambered slots in the fitting so that by turning the collar the filling valve will be tightly secured in place. This provides convenient means of dismounting the filling valve from the fitting 17 whenever it is necessary to wash out the container 12. On the opposite side of the container and adjacent the bottom thereof there is an outlet valve which is similar in construction to the filling valve, this valve 25 being secured in a bushing 26 in the keg by means of a collar 27 screwed into said bushing.

A tap, not shown, may be applied to the valve 25 for withdrawing the beverage from the container. This tap may be of standard form adapted for engagement with the stem 28 of the closure member of the valve 25 so that said closure member may be turned to open the valve and control discharge of the beverage. While I have described a particular form of filling valve and discharge valve it will be understood that other standard forms of valve may be employed without departing from the spirit and scope of my invention.

The container or chamber 13 opens through the top of the keg and is normally closed by a lid 30 which bears upon a seat ring 31 surrounding the opening. This lid preferably consists of a double-walled disk with a filling 32 of insulating material between the walls. The end wall of the disk is provided near its periphery with key-slots 33 to receive the heads of studs 34 projecting from the keg. The lid is secured in closed position by pressing it down so that the studs enter the key-slots and then turning the lid by means of a pin wrench. The lid is provided with sockets 35 to receive the pins of the wrench. By this means the container may be very tightly sealed against considerable pressure so as not to permit any gas from the dry ice to escape past the lid. However, two vents are provided for the gas, one leading into the container 12 and the other being a safety valve opening out into the porous insulation 15.

In operation a considerable gas pressure is maintained in the chamber 13, such pressure being much higher than the normal pressure of gas desirable in the beverage. Hence, the discharge of gas from the chamber 13 into the chamber 12 is controlled by a reduction valve 38 which may be suitably set by means of an adjusting handle 39 to maintain the desired pressure of the gas entering the chamber 12. This reduction valve which is not shown in detail, may be of any suitable standard form now on the market. The gas entering the reduction valve passes by way of a pipe 40 into a dome or recess 12a in the top wall of container 12. There is a check valve 41 at the discharge end of this pipe which opens toward the container. The purpose of the check valve is to prevent any back pressure during filling of the chamber 12, from forcing the beverage through the pipe 40 and into the chamber 13. Any suitable safety valve may be used for the chamber 13. The safety valve illustrated comprises a plug member 42 operating within a casing 43. The plug member 42 has a stem 44 which is guided at its outer end in an adjusting head 45 threaded into the casing. A spring 46 between the adjusting head and a collar 47 on the stem determines the pressure of gas that may be maintained in the chamber 13. When the power of the spring is overcome by the pressure of the gas, the latter escapes into the casing 43 and thence through ports 49 into the filling material 15. Ports 50 are provided in the chimes of the keg permitting the gas to escape. In this way the insulation material is kept cool by the frigid sublimate from the dry ice.

The safety valve is set to maintain a pressure of say 50 to 60 pounds per square inch in the chamber 13 while the pressure in the chamber 12 is preferably 4½ lbs. so that there will be an ample supply of carbon dioxide gas always on hand in chamber 13 to replace any beverage withdrawn and maintain a constant pressure in the beverage chamber.

In order to provide some control of the temperature produced by the discharge of gas through the safety valve, a thermostatic means may be employed to open the safety valve at a lower pressure than that for which it is set when the temperature of the filling material rises above a predetermined value. Such a thermostatic control may be of any well-known type. In Figure 1, I have shown, by way of illustration, a bulb 51 containing an expansible fluid. This bulb is embedded in the filling material 15 and communicates with bellows 52 in the valve casing 43. A bell-crank 53 mounted in said casing has one arm bearing against said bellows and the other arm bearing against the collar 47.

In operation, if the temperature should rise above a predetermined value in the insulation material 15 the resultant expansion of the fluid in the bulb and bellows would cause the bell-crank to assist the pressure of the gas in overcoming the pressure of the spring 46 so that there will be a discharge of the gas at lower than normal pressure until the temperature of the insulation material has been lowered to the predetermined degree. However, to a large extent the temperature of the insulation is automatically controlled because as the insulation warms up the rate at which the dry ice sublimes is increased and hence there is a corresponding increase of pressure on the spring 46 tending to open the safety valve 42.

It will be understood that the primary purpose of supplying compressed gas to the beverage chamber is not to assist in forcing the beverage out of the chamber when the tap is opened but to prevent the gas in the beverage from escaping out of the liquid. Of course the gas pressure does assist in dispensing the beverage from the chamber, but this is a secondary object of the pressure atmosphere in the chamber.

In place of using gas under pressure from the refrigerant to exert pressure upon the beverage a pump may be employed to build up a predetermined air pressure on the beverage. A device employing such pump is shown in Figs. 4 to 6 inclusive. This device comprises an outer shell 58 of metal within which are a pair of metal containers 59 and 60, the former being adapted to receive the beverage which is to be dispensed and the latter serving as a receptacle for dry ice. The beverage container 59 may be supported on frame members 61 of heat insulating material and the container 60 is directly secured to the container 59. A filling of loose insulation material 62 is provided between the containers and the outer shell 58. In the front wall of the keg, near the lower end thereof, is an annular fitting 64 to which a faucet or tap 65 is hinged. This faucet normally occupies the position shown in full lines in Fig. 4 and is locked in this position by a suitable locking member 66. Whenever it is desired to fill the container 59 or to wash out the same, the lock 66 may be opened and the faucet may be swung on its hinge to the position shown in broken lines.

Access to the dry ice chamber 60 may be had through an opening in the rear wall of the keg. This opening is normally closed by a lid 68 (see Figs. 4 and 6) which may be readily slid open whenever it is desired to introduce a new charge of dry ice. Preferably the lid does not provide a tight seal for the chamber 60 so that there is no danger of building up gas pressure in this chamber.

In the upper part of the keg and located between the two containers is a pump which may be operated to develop the requisite pneumatic pressure in the container 59. This pump has a barrel 70 in which slides a plunger 71. The plunger has a hollow stem 72 which projects from the barrel and is fitted with a handle 73. The outer end of the barrel is closed by a head 74 provided with air intake ports 75. At the opposite end of the barrel there is a discharge nozzle 76 which is adapted to be connected by a coupling device 77 to a pipe 78 leading into the top of the beverage chamber 59. Within the discharge nozzle 76 there is a spring-pressed check valve 79 of the type commonly used in automobile tires. The construction is shown more clearly in Fig. 7 which illustrates a pump similar to that shown in Fig. 4 except for certain details connected with the intake into the barrel of the pump, and in which corresponding parts are indicated with the same reference numerals. The valve 79 has a stem 80 projecting outwardly toward the barrel so that by depressing this stem the pressure within the receptacle 59 may be restored to atmospheric pressure. As a means for depressing the stem a button 81 is provided in the handle 73, said button being normally pressed outwardly by a spring 82. A rod 83 extends from the button through the hollow stem 72 and terminates in a head 84. The latter normally closes the inner end of the hollow stem and has a pointed projection adapted to engage the stem 80 when the button is depressed. Ports 85 are formed in the handle 73 and communicate with the interior of the hollow stem 72.

In operation, after each withdrawal of beverage from the container 59 the pump is operated to force air into the container so as to maintain the desired pressure on the beverage. Since, however, the withdrawal of beverage from the container 59 might result in an actual partial vacuum in the container, it is desirable before each operation of the pump to depress the stem of the check valve so that air may flow in from the outside atmosphere to reduce the amount of pumping necessary. Also it may be desirable to admit air into the container while the beverage is being withdrawn. Such air inflow is effected by depressing the button 81, thereby causing the head 84 to engage the stem 80 and open the check valve. Air will then flow into the beverage chamber through the ports 85, hollow stem 72, check valve 79, and pipe 78. Thereafter, a few operations of the pump will build up sufficient air pressure in the container 59 to prevent material loss of carbon dioxide from the beverage.

While the system of supplying compressed air in the container 59, as described above, retards the discharge of carbon dioxide from the beverage it does not entirely prevent it, and there will be a certain loss due to diffusion, regardless of the air pressure. It is preferable therefore to provide an atmosphere of compressed carbon dioxide in the beverage chamber. This can be done by modifying the pump so that it will draw in carbon dioxide from a suitable source, instead of air. Such a pump is illustrated in Fig. 7. This pump differs from that shown in Fig. 4, mainly in the fact that there are no intake ports 75 in the head of the pump. Instead a sealed head 90 is provided in place of the head 74 and in the side of the pump barrel there is an intake port fitted with a check valve 91 which opens toward the barrel. By means of a coupling 92 this intake port may be connected to a pipe 93 leading from a source of carbon dioxide gas. In fact the pipe 93 may lead from the chamber 69 so that it will draw on the gas from the dry ice in this chamber. Preferably, however, the pipe 93 leads to a separate source of carbon dioxide gas.

The operation of this device is similar to that described immediately above. As the beverage is drawn off a partial vacuum may be formed in the receptacle 59 and this is corrected and the atmosphere restored to normal pressure by depressing the stem 80 of the valve 79. Thereafter the pump handle 73 is operated to draw carbon dioxide past the check valve 91 and force the same into the beverage chamber 59. It will be observed that in each of the pumps illustrated the head 84 normally closes the inner end of the hollow stem 72 so that there will be no leakage of air or gas during the pumping operation.

I have described a preferred form of beverage cooling and dispensing apparatus and certain modifications thereof showing means for maintaining a predetermined pressure on the beverage so as to prevent it from becoming flat and also providing means for maintaining the beverage at a desired temperature. I wish it to be understood, however, that the particular embodiments illustrated are not to be taken as limitative of the invention but I reserve the right to make such changes in form, construction and arrangement of parts as fall within the spirit and scope of the following claims.

I claim:

1. A dispensing container for an effervescing beverage, comprising a casing containing insulating material, said insulating material being in contact with each of a pair of chambers in thermal communication with each other, one chamber serving as a reservoir for said beverage and the other as a receptacle for solidified carbon dioxide, means for circulating carbon dioxide gas from said receptacle about said reservoir to cool the beverage therein, and means for feeding part of the gas to said reservoir to maintain a predetermined pressure on the beverage.

2. A dispensing container for an effervescing beverage, comprising a casing provided with a pair of heat insulated chambers in thermal communication with each other, one chamber serving as a reservoir for said beverage and the other as a receptacle for solidified carbon dioxide, means for circulating carbon dioxide gas from said receptacle about said reservoir to cool the beverage therein, and thermo-sensitive means for controlling the discharge of said gas from the receptacle.

3. A dispensing container for an effervescing beverage, comprising a pair of receptacles, one serving as a reservoir for said beverage and the other forming a chamber for a supply of solidified carbon dioxide, a porous heat insulation surrounding the receptacles, means for sealing said chamber to maintain carbon dioxide gas under pressure therein, and a safety valve adapted to discharge excess carbon dioxide gas from said chamber into said insulation material.

4. A dispensing container for an effervescing beverage, comprising an outer shell, a pair of receptacles therewithin, a packing of heat insulation material between the shell and the receptacles, one receptacle serving as a reservoir for said beverage and the other forming a chamber for a supply of solidified carbon dioxide, means for sealing said chamber to maintain carbon dioxide gas under pressure therein, and means for discharging excess gas from said chamber into said packing, the shell being formed with ports for release of the gas to atmosphere.

5. A dispensing container for an effervescing beverage, comprising an outer shell, a pair of receptacles therewithin, a packing of heat insulation material between the shell and the receptacles, one receptacle serving as a reservoir for said beverage and the other forming a chamber for a supply of solidified carbon dioxide, means for sealing said chamber to maintain carbon dioxide gas under pressure therein, means for feeding part of said gas at reduced pressure into said reservoir, and means for discharging excess gas from said chamber into the packing, the shell being provided with ports for the release of the gas to atmosphere.

6. A dispensing container for an effervescing beverage, comprising an outer shell, a pair of receptacles therewithin, a packing of heat insulation material between the shell and the receptacles, one receptacle serving as a reservoir for said beverage and the other forming a chamber for a supply of solidified carbon dioxide, means for sealing said chamber to maintain carbon dioxide gas under pressure therein, and a safety valve adjustable to discharge gas above a predetermined pressure from said chamber into the packing, the shell being formed with ports to release said gas to atmosphere after it has circulated about said reservoir.

7. A dispensing container for an effervescing beverage, comprising an outer shell, a pair of receptacles therewithin, a packing of heat insulation material between the shell and the receptacles, one receptacle serving as a reservoir for said beverage and the other forming a chamber for a supply of solidified carbon dioxide, means for sealing said chamber to maintain carbon dioxide gas under pressure therein, a safety valve adjustable to discharge gas above a predetermined pressure from said chamber into the packing, and thermo-sensitive means for discharging the gas at a lower pressure when the temperature of the packing rises above a predetermined normal, the shell being formed with ports to release said gas to atmosphere after it has circulated about said reservoir.

8. A dispensing container for an effervescing beverage, comprising a casing formed with a pair of heat insulated chambers in thermal communication with each other, one of the chambers serving as a reservoir for said beverage and the other as a receptacle for solidified carbon dioxide to cool said beverage, means for drawing off beverage from the reservoir at will, and a pump mounted in the casing and operable to maintain a predetermined gas pressure in said reservoir.

9. A dispensing container for an effervescing beverage, comprising a casing formed with a pair of heat insulated chambers in thermal communication with each other, one of the chambers serving as a reservoir for said beverage and the other as a receptacle for solidified carbon dioxide to cool said beverage, means for drawing off beverage from the reservoir at will, and a pump mounted in the casing and operable to supply said reservoir with carbon dioxide gas from said receptacle so as to maintain a predetermined normal pressure on the beverage in the reservoir.

10. A dispensing container for an effervescing beverage, comprising a casing formed with a pair of heat insulated chambers in thermal communication with each other, one of the chambers serving as a reservoir for said beverage and the other as a receptacle for solidified carbon dioxide to cool said beverage, means for drawing off beverage from the reservoir, a pump mounted in the casing and operable to maintain a predetermined gas pressure in said reservoir, and means for relieving said pressure at will.

11. A dispensing container for an effervescing beverage, comprising a casing formed with a pair of heat insulated chambers in thermal communication with each other, one of the chambers serving as a reservoir for said beverage and the other as a receptacle for solidified carbon dioxide to cool said beverage, means for drawing off beverage from the reservoir at will, a pump mounted in the casing and operable to maintain a predetermined gas pressure in said reservoir, said pump including a relief valve for relieving the pressure in the reservoir, and control means on the pump for operating said relief valve.

GILBERT S. SWEM.